INVENTORS
ROBERT W. POLKINGHORN
ARTHUR F. PFEIFER
BY
Robert G. Rogers
ATTORNEY

INVENTORS
ROBERT W. POLKINGHORN
ARTHUR F. PFEIFER
BY Robert G Rogers
ATTORNEY

INVENTOR.
ROBERT W. POLKINGHORN
ARTHUR F. PFEIFER
BY Robert G Rogers
ATTORNEY

United States Patent Office
3,480,796
Patented Nov. 25, 1969

3,480,796

MOS TRANSISTOR DRIVER USING A CONTROL SIGNAL

Robert W. Polkinghorn, Huntington Beach, and Arthur F. Pfeifer, Whittier, Calif., assignors to North American Rockwell Corporation, a corporation of Delaware
Filed Dec. 14, 1966, Ser. No. 601,602
Int. Cl. H03k *17/02*
U.S. Cl. 307—251 6 Claims

ABSTRACT OF THE DISCLOSURE

A driver for MOS devices comprising a capacitor connected between the gate electrode of an output MOS transistor and a signal source, including switch means connected to said capacitor. A control signal is provided which increases the voltage on the gate electrode of the output transistor in proportion to the charge distribution between said capacitor and the parasitic capacitance of the circuit.

DESCRIPTION OF PRIOR ART

Field of the invention

A metal oxide semiconductor (MOS) transistor driver using a capacitor and control signal for boosting the output voltage.

Description of the prior art

On or about Dec. 15, 1966, an application having the title of "MOS Driver Using Capacitive Feedback" was filed by Polkinghorn et al. The application contained a description of the problems associated with prior art drivers, as well as several embodiments of devices which overcame the problems described. However, in certain applications requiring the use of an MOS driver, a relatively constant output voltage must be maintained by an output transistor for relatively long periods of time. The charge on the feedback and other capacitance of the embodiments described in the previous application tended to "leak" and cause the output voltage to decay proportionately. In order to recharge the capacitance and utilize the "feedback" effect described, it was necessary to switch the output from its "true" level to, for example, a "false" level.

A driver is desired which can provide an increased voltage and current output without increasing the supply voltage and which can maintain a relatively constant output level for relatively long periods of time.

SUMMARY OF THE INVENTION

Briefly, the invention is intended to overcome many problems of the prior art and to provide an MOS driver having an output which can remain relatively constant for long periods of time. The constant voltage output is obtained by means of a discrete capacitor connected between the gate of the output transistor and the source of a control signal. Initially, the capacitor is permitted charge to a voltage level by switch means connected between the capacitor and a voltage level. Parasitic, or effective, capacitance of the driver is charged simultaneously. Subsequently, the control signal is applied to applied to increase the voltage on the gate electrode of an output transistor in proportion to the charge on the capacitor.

If the parasitic capacitance is not small relative to the circuit capacitor, charge from the circuit capacitor is distributed to the parasitic capacitance. As a result, the charge on the circuit capacitance is not as large as possible and the voltage on the gate electrode is not increased the full amount of the control signal voltage.

In an MOS device the gate voltage must be at least one threshold more negative than the source electrode in order to cut the transistor on. If the capacitor voltage plus the voltage of the control signal exceeds the minimum requirement, the output transistor is turned fully on and the output is set to the voltage of the source. However, if the parasitic capacitance "drains" charge from the capacitor produced as a circuit component, the combined voltage may not be adequate to cut the transistor on as fully as desired. In that case, the output voltage may be proportionately less than the supply voltage.

If the charge on the capacitance "leaks," the source can momentarily be connected to ground to permit recharging of the capacitor. If the output is connected to a capacitive load, while the capacitance is being recharged, and before the source becomes true, the output will not appreciably change. Without a capacitive load, the output may become more positive by two thresholds. For either type of load, the output change is not substantial and the maximum negative voltage may be quickly restored.

Although MOS devices using negative voltages are illustrated and described herein, it should be obvious that devices usable with positive voltages could be used equally well without departing from the scope of the invention. A negative voltage level has been adapted as a "true" state and a zero level has been adapted as a "false" state. The states may be changed without exceeding the scope of the invention.

It is a further object of this invention to provide an MOS transistor driver using a capacitor and control signal for increasing the output voltage and current from the driver without increasing supply voltage, and which is capable of maintaining said output constant for relatively long periods of time.

It is still a further object of this invention to provide an MOS driver having relatively constant voltage output and relatively reduced power dissipation.

These and other objects of this invention will become more apparent in connection with the following drawings of which,

DESCRIPTION OF THE PREFERRED EMBODIMENTS

Figure 1:
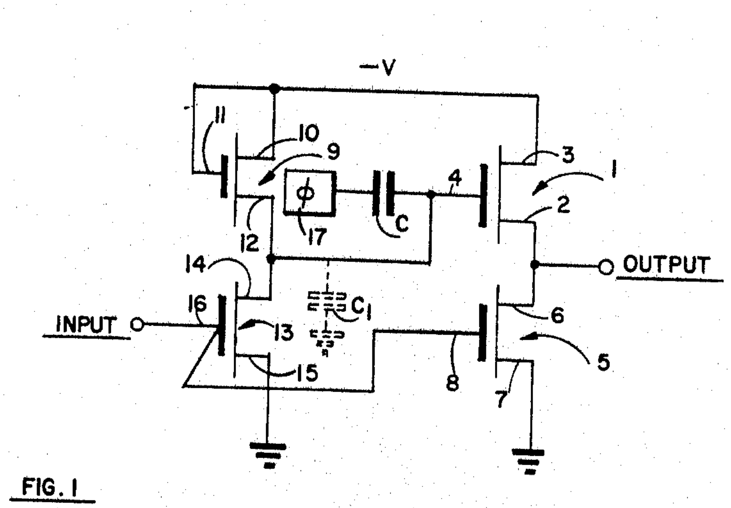
FIGURE 1 illustrates a preferred embodiment of the invention having a charging capacitor and a control signal.

Referring now to FIGURE 1, wherein is shown output transistor 1 comprising source electrode 2 connected to the output, and drain electrode 6 of transistor 5. Source electrode 7 of transistor 5 is connected to ground and gate electrode 8 is connected to an input signal. In other embodiments, source 7 may be connected to a voltage level. Drain electrode 3 of transistor 1 is connected to voltage and current source, —V.

The driver further comprises MOS transistor 9 having drain electrode 10 and gate electrode 11 connected to —V. Source electrode 12 is connected to gate electrode 4 of transistor 1. Transistor 13 includes drain electrode 14 connected to gate 4, source electrode 15 connected to ground, and gate electrode 16 connected to the input. The input may be either a true or false signal.

Capacitor C is connected to signal source 17 and gate electrode 4 of transistor 1. The gate is also connected to the output (source electrode 12) of transistor 9. Capacitor $C_1$, represented by the dotted lines, is comprised of the parasitic capacitance of the device.

In operation, when the input is true, or negative, transistors 5 and 13 are cut on and the output and gate electrodes of transistor 1 are connected to a level approximating ground. There is a small voltage drop across the transistors 13 and 5 and as a result, the output and gate voltages may be slightly different from a zero level. Transistor 9 is held on during this period of time because its gate voltage is more than one threshold more negative than its source voltage which is at the voltage of gate 4.

When the input becomes false, or zero, transistors 5 and 13 are turned off and gate electrode 4 is connected through the low resistance of transistor 9 to —V. The signal from source 17 becomes false and connects the capacitor to ground. Capacitor C and capacitance $C_1$ charge to the voltage, $-V+V_t$, appearing at electrode 12 of transistor 9. As soon as the capacitor has been charged, the source voltage of transistor 9 becomes equal to one threshold greater than the gate electrode and the transistor is cut off.

After the capacitor has been charged, signal $\phi$ from source 17 becomes true, or negative. A portion of the charge on Capacitor C flows into, or is distributed to, the capacitor $C_1$. The exact quantity of charge distributed depends on the relative sizes $C_1$ and C, as well as the magnitude of $\phi$. If $C_1$ is small compared to C, the effects on circuit operation is minimum, that is, little charge is required to increase the voltage across $C_1$ to ground. However, if $C_1$ is not small when compared with C, the value of $\phi$ and C, may have to be adjusted so that after the redistribution of charge between C and $C_1$, a desired output level will be produced.

As indicated, the voltage increase on gate electrode 4 is proportional to capacitor C, capacitance $C_1$, and the value of signal $\phi$. If an increase in voltage of $\Delta V$ on gate is desired, capacitor C must be selected in accordance with the following equation:

$$C=\frac{C_1\Delta V}{V\phi-\Delta V} \quad (1)$$

where $\Delta V$ is the increase in voltage across $C_1$ due to the redistribution in charge from C when $\phi$ is applied, and $V\phi$ is the "true" voltage level of signal $\phi$. If $\Delta V$ is equal to $2V_t$, then the output transistor would be turned on to —V. Without Capacitor C and $\phi$ the output would be $-V+2V_t$.

The control signal must be applied, or become true, at or after the time that capacitor C is charged to the voltage level appearing at electrode 12. Otherwise, the effect of the voltage increase on the gate will not increase the output voltage. In other words, if the control signal is applied before the time indicated, the output will be set to —V plus one threshold with a faster response but the desired voltage increase will not occur.

Figure 2:
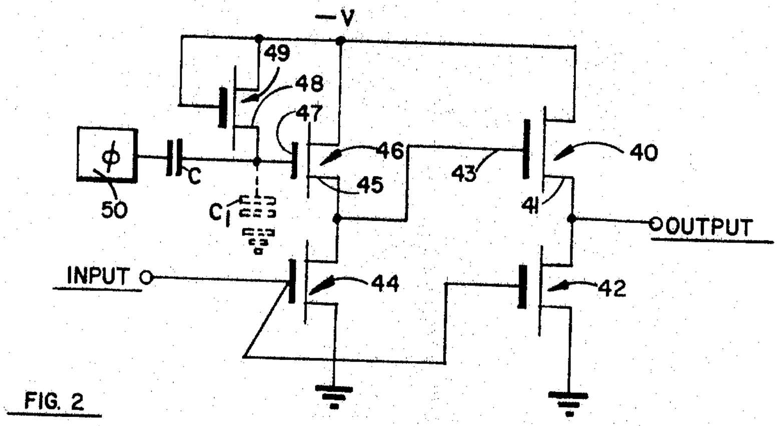
FIGURE 2 refers to a second embodiment of the invention.

Referring now to FIGURE 2, wherein is shown a second embodiment of a driver using a control signal $\phi$ and comprising output transistor 40 having source electrode 41 connected to the output and through transistor 42 ground. Gate electrode 43 is connected to the drain electrode of transistor 44 and to source electrode 45 of transistor 46. Capacitor C is connected to gate 47 of transistor 46 and to signal source 50. Gate 47 is also connected to the source electrode 48 of transistor 49.

In operation, the signal source connects one side of the capacitor C to ground. Capacitor C and capacitance $C_1$ charge to the voltage appearing on electrode 48, that is, $-V+V_t$. Transistor 49 was turned on because its gate electrode was one threshold more negative than the voltage at its source electrode. Subsequently, signal $\phi$ becomes true. The charge on capacitor C may be partially distributed to $C_1$ depending on the relative size of the capacitor. Assuming source electrode $C_1$ to be small when compared with C, the voltage on gate 47 will be increased by the amount of signal $\phi$. Transistor 46 is turned fully on and electrode 45 is set to the value of the supply, —V. The output from transistor 40 is then set at $-V+V_t$.

In the case where $C_1$ is small when compared with C, $C_1$ will be charged to the voltage of the source plus its original charge, $-V+V_t$. In other words, since, $$V=\frac{\phi}{C_1} \quad (2)$$

and since $C_1$ is small, a relatively large voltage increase, $V\phi$, can be obtained within a small charge.

However, if $C_1$ is relatively large, more charge may be required to bring it to a desired level. The voltage, $V\phi$, may therefore be inadequate to provide charge to $C_1$ and C, in sufficient quantities to increase the gate voltage the desired amount of $-2V_t$ Stated differently, since the gate electrode is set at $-V+V_t$ before signal $\phi$ becomes true, source electrode 45 can only be set at $-V+2V_t$. Therefore, in order to set electrode 45 to the value of —V, the increase at the gate electrode must be at least $-2V_t$.

It is possible for $C_1$ to take charge from C when $\phi$ is true and still achieve the desired increase at the gate. Also, in certain applications, less of an output voltage increase may be required and the relative size of the capacitor may be less critical.

The value of capacitor C necessary to achieve the desired increase may be determined by the following equation:

$$C=\frac{2C_1V_t}{V\phi-2V_t} \quad (3)$$

where $V\phi$ is the voltage of the signal source when the signal is at a "true" voltage level. If capacitor C or $C_1$ discharges enough to change the output level, the signal source may be momentarily set false, or to ground, to permit recharging of the capacitors to their previous level.

Figure 3:
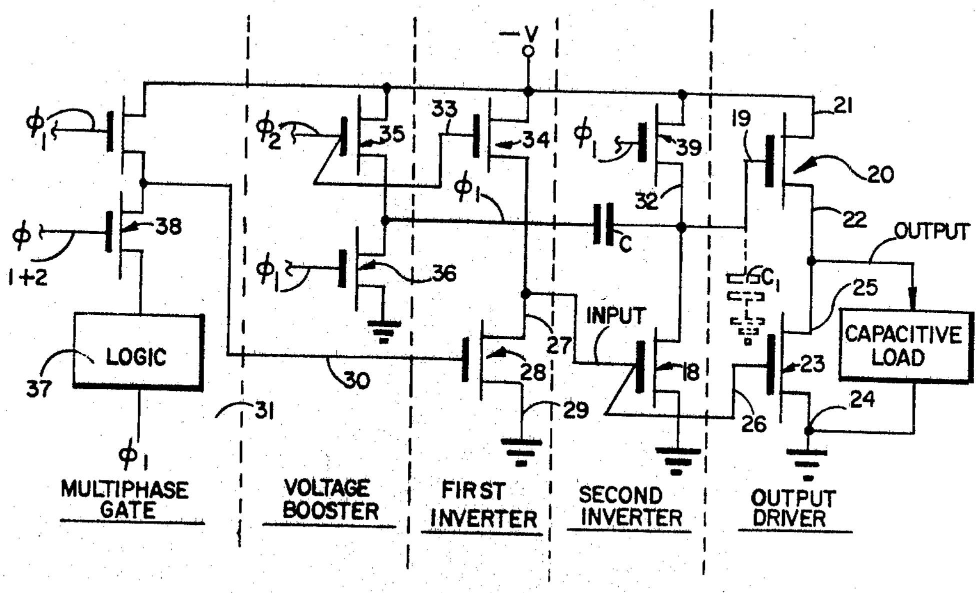
FIGURE 3 illustrates another embodiment of the invention including means for generating a control signal.

Referring now to FIGURE 3, wherein is shown the invention in a low power driver circuit embodiment. The driver includes an output stage comprising transistors 20 and 23. Output transistor 20 has its drain electrode 21 connected to source voltage, —V, and its source electrode 22 connected to the output and to electrode 25 of transistor 23. Transistor 23 includes source electrode 24 connected to ground and gate electrode 26 connected to the output from a first inverter stage. The first inverter stage comprises transistors 34 and 28. The input signal from multiphase gate 31 is inverted by the transistor 28 of the first inverter stage. Multiphase gating devices which can be used with the invention are described in application entitled "Multiple Phase Gating System, Serial No. 523,767, filed January 28, 1966, by R. K. Booher.

Transistor 34 of the first inverter is connected between the voltage source and electrode 27 of transistor 28. Gate electrode 33 of transistor 34 is connected to an input signal designated as $\phi_2$. Electrode 29 of transistor 28 is connected to ground and gate electrode 30 of transistor 28 is connected to the output from the gating stage which may be a signal having either a logically true or false level. For the particular embodiment shown in FIGURE 3, signals $\phi_1$ and $\phi_2$ have negative levels more level than —V by at least one threshold. As will be seen later, the negative increase permits capacitor C to be charged to the value of the source —V. The signal could have a negative level of —V but in that case, the capacitor would charge to $-V+V_t$.

For the particular embodiment shown, the output from the gating stage is set to a negative value when input signal, $\phi_1$, is true. It is conditionally set to a false value if logic 37 is true when input signal $\phi_2$ is true. In other words, if the logic is true at the same time as $\phi_2$ is true, $\phi_1$ would be false and the gate output would be connected to ground. The input to the gate of transistor 38 is the logical "or" of $\phi_1$ and $\phi_2$.

Gate electrode 19 of transistor 20 is connected to capacitor C and to source electrode 32 of transistor 39. Transistor 39 and transistor 18 form a second inverter stage which inverts the input signal to transistor 28 a second time. A signal having the original logical state of the multiphase gate output (input to transistor 28), appears at the drain electrode of transistor 18.

The other side of capacitor C is connected to a voltage booster stage comprising transistors 35 and 36. Transistor 36 is controlled by input signal $\phi_1$ and transistor 35 is controlled by an input signal $\phi_2$. When $\phi_1$ is false, the output from the booster stage is true ($\phi'_1$).

Although gate 33 of transistor 34 is shown connected to input signal $\phi_2$, it could be connected to the supply voltage. A supply connection would consume additional power. The gate of transistor 39 is connected to $\phi_1$, so that the capacitor C can charge to —V when $\phi_1$ is true. It could also be connected directly to the supply but the capacitor would be charged only to $-V+V_t$.

Parasitic capacitance $C_1$ is illustrated by the dotted connection from gate 19 to ground.

In operation, when $\phi_1$ is true, the output from the first inverter stage is false and transistor 18 of the second inverter stage is turned off. Transistor 36 is turned on and one side of the capacitor is connected to a ground level. The other side of the capacitor is connected to —V through transistor 39 and charges to —V voltage. When fully charged, transistor 39 is cut off unless leakage from C and $C_1$, also charged to —V, occurs.

Subsequentialy, $\phi_1$ becomes false and $\phi_2$ becomes true. If logic 37 is true, transistor 28 is turned off and transistors 18 and 23 are turned on. The output is set false, or ground, and capacitor C is discharged through transistor 18. However, if it is assumed that logic 37 is false, transistor 28 remains on and transistors 18 and 23 remain off. Transistor 35 is also turned on because $\phi_2$ is true and the voltage, —V, is connected to one side of the capacitor through transistor 35. If $C_1$ is small compared to C or if $C_1$ does not have a capacity sufficient to prevent an increase on gate 19 by at least one threshold, the output will be boosted to —V. As previously discussed, as $C_1$ becomes larger relative to C, more charge from C flows into $C_1$ and the increase on the gate may be less.

Figure 4:
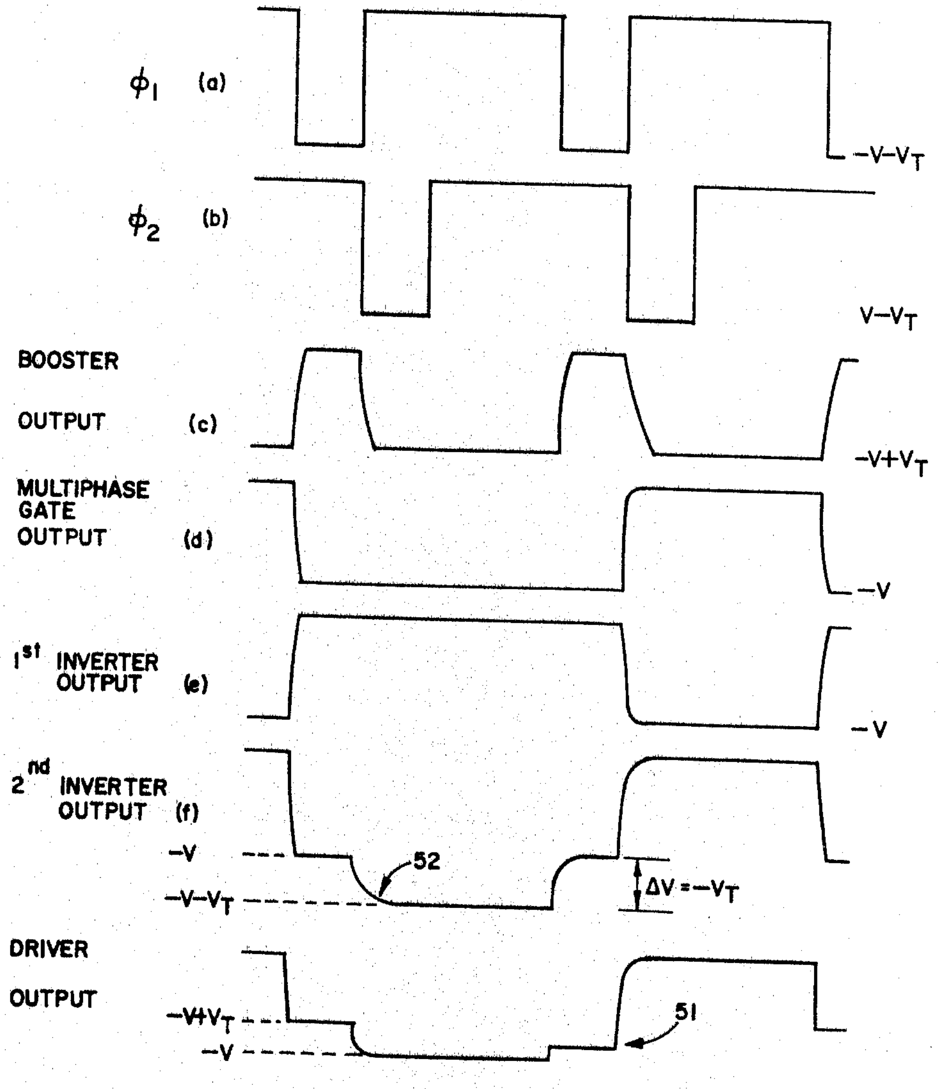
FIGURE 4 refers to curves describing the operation of the FIGURE 3 embodiment.

The curves shown in FIGURE 4 illustrate the operation of the circuit previously discussed. As shown therein, when $\phi_1$ is true (curve *a*), or negative, the output from the voltage booster stage is false or zero (curve *c*) and the output from multiphase gate 31 is true (curve *d*). In addition, the output from the first inverter is false (curve *e*). The second inverter and the driver outputs are true at a level less than —V (curves *f* and *g*). Subsequently, when $\phi_2$ becomes true (curve *b*), the voltage from the booster stage becomes true and assuming that logic 37 is false, the multiphase gate output remains true. The first inverter output remains false and the output from the second inverter stage is boosted more negative (point 52 of curve *f*) in proportion to the booster voltage and the relative capacities of C and $C_1$. For the particular embodiment shown, $C_1$ has a relative capacitance such that the voltage at gate 19 ($\Delta V$ curve *f*) is increased by two thresholds as a result of the voltage boost. The driver output voltage (curve *g*) is accordingly increased to —V. Without the booster increase, the output voltage would be $-V+V_t$.

Assuming a capacitor load for the driver, if the charge for $C_1$ and C "leaks off," when $\phi_1$ is set true, the capacitor will be recharged and the output will change only by the small amount shown at point 51 of curve *g*. If the load is not capacitive, when $\phi_1$ is true, the output will become $-V+V_t$.

Although the invention has been described and illustrated in detail, it is to be understood that the same is by way of illustration and example only, and is not to be taken by way of limitation; the spirit and scope of this invention being limited only by the terms of the appended claims.

We claim:

1. An MOS transistor driver comprising,
capacitor means,
a first MOS transistor means having an output electrode for providing an output voltage, a second electrode connected to a first voltage level, and a gate electrode connected to one side of said capacitor means,
first means for connecting one side of said capacitor means to approximately said first voltage level, signal source means connected to the other side of said capacitor means for generating a signal having a second voltage level when said capacitor means is connected to approximately said first voltage level for charging said capacitor means to the difference between said levels, and for connecting the other side to a signal having approximately said first voltage level after said capacitor means has been charged for increasing the charge on said capacitor means by an amount proportional to the first voltage level of said signal for driving the output electrode of the first MOS transistor means to said first voltage level.

2. The combination as recited in claim 1, wherein said first means for connecting comprises a switch means connected between said one side of the capacitor means and said first voltage level for inserting a relatively low impedance between said one side of the capacitor means and the voltage level while the capacitor is charging to the difference between said levels, and for inserting a relatively high impedance between said one side of the capacitor means and said voltage level after the capacitor means has been charged to the difference between said levels.

3. An MOS transistor driver comprising,
capacitor means,
means connected to both sides of said capacitor means for charging said capacitor means,
voltage and current source means,
a first MOS transistor means having an output electrode for providing an output voltage, a second electrode connected to said voltage and current source, and a gate electrode connected to one side of said capacitor means,
said means connected includes a signal source means for connecting the other side of said capacitor means to a first voltage level at least while said capacitor is charging and to a second voltage level after the capacitor is charged, whereby the voltage on the gate electrode is changed in proportion to the charge on said capacitor means, and the voltage on the output electrode of the first MOS transistor means is changed in proportion to the change in voltage on the gate electrode,
means for generating an input signal having a true and a false level,
a second MOS transistor means having a gate electrode connected to said input means, a first electrode connected to said output electrode, and another electrode connected to a logical false level, said gate electrode being responsive to the input signal for setting said output electrode to said false level when the input signal is true, and
further comprising third and fourth MOS transistors comprising a push-pull output stage, with a first one of said MOS transistors having a gate electrode connected to said output electrode and a second one of said push-pull transistors having a gate electrode connected to said input means.

4. An MOS transistor driver comprising,
capacitor means,
means connected to both sides of said capacitor means for charging said capacitor means,
voltage and current source means,
a first MOS transistor means having an output electrode for providing an output voltage, a second electrode connected to said voltage and current source, and a gate electrode connected to one side of said capacitor means, said means connected includes a signal source means for connecting the other side of said capacitor means to a first voltage level at least while said capacitor is charging and to a second voltage level after the capacitor is charged, whereby the voltage on the gate electrode is changed in proportion to the charge on said capacitor means, and the voltage on the output electrode of the first MOS transistor means is changed in proportion to the change in voltage on the gate electrode, said means connected comprises a first switch means connected between said one side of the capacitor means and said voltage and current source means including means for turning said switch means on for inserting a relatively low resistance between said voltage and current source and the one side of said capacitor means and further including means responsive to the charge on said capacitor for turning said switch means off for inserting a relatively high resistance between said voltage and current source means and the one side of said capacitor means, and input means for providing an input signal having a true and a false level, second switch means connected between the one side of said capacitor means and a logical false level and having control means responsive to the true level of said input signal for connecting the one side of said capacitor to the false level for discharging said capacitor whereby the gate of the first MOS transistor means is connected to said false level and the voltage on the output electrode is changed.

5. An MOS transistor driver comprising, capacitor means, means connected to both sides of said capacitor means for charging said capacitor means, voltage and current source means, a first MOS transistor means having an output electrode for providing an output voltage, a second electrode connected to said voltage and current source, and a gate electrode connected to one side of said capacitor means, said means connected includes a signal source means for connecting the other side of said capacitor means to a first voltage level at least while said capacitor is charging and to a second voltage level after the capacitor is charged, whereby the voltage on the gate electrode is changed in proportion to the charge on said capacitor means, and the voltage on the output electrode of the first MOS transistor means is changed in proportion to the change in voltage on the gate electrode, said capacitor means includes a discrete capacitor having a capacity for retaining substantially all of the charge on said discrete capacitor when said signal source means connects the other side of said capacitor means to said second voltage level whereby the change in voltage on the gate electrode is substantially equal to the second voltage level.

6. An MOS transistor driver comprising, capacitor means, means connected to both sides of said capacitor means for charging said capacitor means, voltage and current source means, a first MOS transistor means having an output electrode for providing an output voltage, a second electrode connected to said voltage and current source, and a gate electrode connected to one side of said capacitor means, said means connected includes a signal source means for connecting the other side of said capacitor means to a first voltage level at least while said capacitor is charging and to a second voltage level after the capacitor is charged, whereby the voltage on the gate electrode is changed in proportion to the charge on said capacitor means, and the voltage on the output electrode of the first MOS transistor means is changed in proportion to the change in voltage on the gate electrode, said capacitor means includes a discrete capacitor having a capacity relative to the effective capacitance associated with said gate electrode for retaining enough of said charge for changing the voltage on the gate electrode to a required level.

References Cited

UNITED STATES PATENTS

| | | | |
|---|---|---|---|
| 3,286,189 | 11/1966 | Mitchell et al. | 307—251 |
| 3,296,547 | 1/1967 | Sickles | 307—251 |

DONALD D. FORRER, Primary Examiner

B. P. DAVIS, Assistant Examiner

U.S. Cl. X.R.

307—205, 246, 279, 304